Sept. 16, 1958     L. E. FERGUSON     2,851,867
FLEXIBLE SHAFT CONNECTION
Filed Dec. 24, 1953
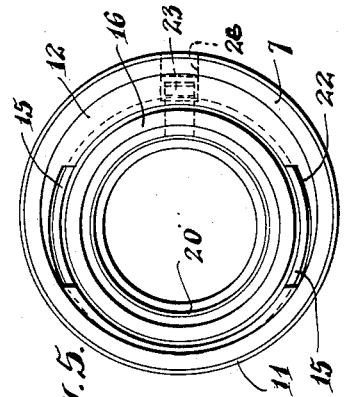
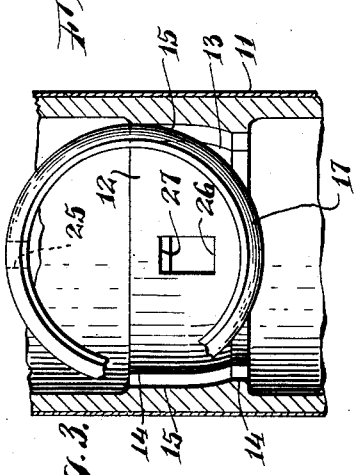
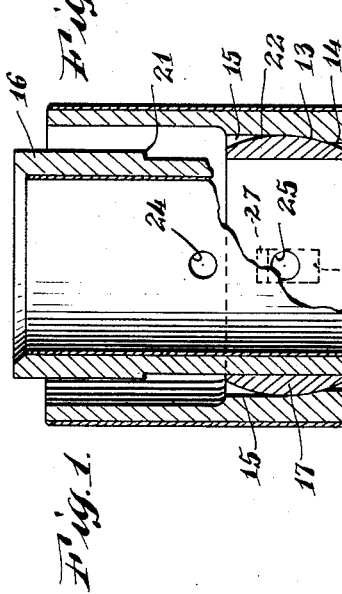
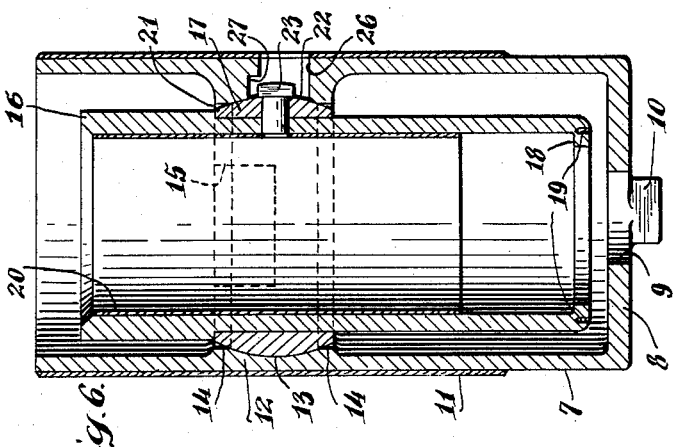
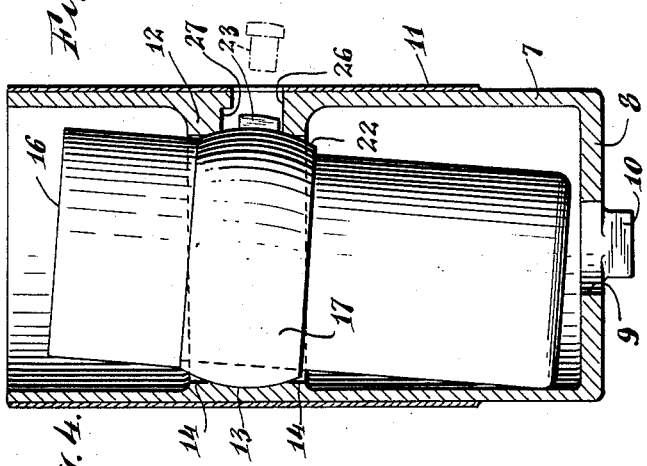
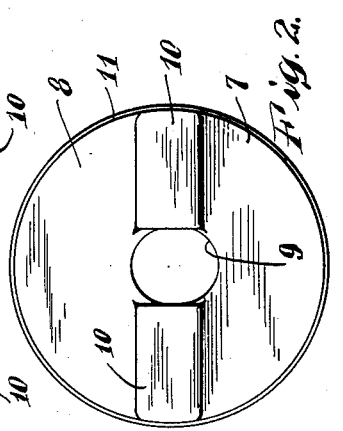
INVENTOR.
L. E. Ferguson
BY John A. Seifert
ATTORNEY.

2,851,867

FLEXIBLE SHAFT CONNECTION

Lester E. Ferguson, River Edge, N. J., assignor to Kennedy-Van Saun Mfg. & Eng. Corporation, New York, N. Y., a corporation of Delaware Application December 24, 1953, Serial No. 400,202

1 Claim. (Cl. 64—7)

This invention relates to gyratory crushers consisting of a gyratory shaft rotatably suspended at its upper end and eccentrically mounted and rotated at its lower end to gyrate a crushing head fixed to the upper portion of said shaft relative to a stationary crushing concave supported by the frame of the crusher to encircle said crushing head. The eccentric mounting of the gyratory shaft consists of a sleeve rotatably supported by the crusher frame and arranged with an eccentric socket to engage and support a ball member secured to the gyratory shaft.

This invention particularly relates to this eccentric mounting of the shaft of the gyratory crusher.

It has been the common practice to produce the sleeve in two longitudinal mating sections to facilitate mounting and securing the ball member in said sleeve and the ball member in one-piece consisting of a tubular portion engaged on the gyratory shaft and arranged intermediate the ends with an exterior integral spherical or ball portion. This method of producing the eccentric mounting entails expensive machining to produce a perfect fit between the eccentric socket and the ball portion.

It is the object of the invention to eliminate this expensive machining of parts by casting the sleeve in one piece with one end closed and arranged with integral lugs for connection with driving mechanism and the eccentric socket integral with the inner face of the side wall of the sleeve, and by forming the ball member of a separate tubular portion and a separate annular ball portion secured to the tubular portion.

It is another object of the invention to arrange the eccentric socket with diametrically opposed recesses to facilitate mounting of the annular ball portion in said socket prior to the mounting of the tubular portion in said annular ball portion.

It is a further object of the invention to provide novel means of securing the tubular and ball portions together, retaining said portions in the sleeve and preventing removal of said means by the gyratory action of the eccentric mounting.

Another object of the invention is to provide an economical and long lasting bearing surface on the exterior of the sleeve.

Further objects and advantages of the invention will be set forth in the detailed description of the invention.

The drawing accompanying and forming a part of this application consists of:

Figure 1 showing a longitudinal-sectional view of the eccentric mounting with the tubular portion being assembled in the annular ball portion subsequent to the assembling of said ball portion in the eccentric socket;

Figure 2 showing a plan view of the bottom of the sleeve;

Figure 3 showing a longitudinal-sectional view of the eccentric socket portion of the sleeve with the annular ball portion being initially engaged therein prior to the engagement of the tubular portion in the ball portion shown in Figure 1;

Figure 4 showing a longitudinal-sectional view of the sleeve with the sleeve turned ninety degrees from the position shown in Figure 1 and the ball member positioned in the sleeve to receive the means to secure the tubular and ball portions of said ball member together and retain the ball member in the sleeve;

Figure 5 showing a top plane view of the fully assembled eccentric mounting; and Figure 6 showing a longitudinal-sectional view of the fully assembled eccentric mounting.

The embodiment of the invention is adapted to be mounted in a gyratory crusher frame of the type shown in Patent No. 1,748,484 patented February 25, 1930, to Joseph E. Kennedy, and comprises a one-piece sleeve 7 rotatably mounted in a tubular bearing member, not shown, in the lower portion of the crusher frame. The sleeve 7 is closed at the bottom by a wall 8 having an opening 9 in the center and lugs 10 projecting from the bottom of the wall 8 at diametrically opposite portions of the opening 9 for connecting the sleeve 7 to the driving mechanism, not shown, of the crusher to rotate the sleeve. The sleeve 7 is cast in one-piece to reduce the cost thereof. To provide a long wearing sleeve, which cannot be accomplished by a casting, the outer surface of said sleeve 7 is first sand blasted. Secondly the sand blasted surface is sprayed with a weld coating of steel and thirdly on said steel coating there is sprayed a coating of genuine babbitt, as indicated at 11.

To impart gyratory movement to the crusher shaft, not shown, by the rotation of the sleeve 7, the interior of the sleeve is arranged with an annular socket 12 eccentric of the axis of the sleeve and having a concave portion 13 between straight end portions 14. Opposed recesses 15 are arranged in the upper end portion 14 and the upper half of the concave portion 13 for a purpose to be hereinafter described. The centers of the recesses 15 are in alignment with the axis of the socket 12.

The gyratory shaft, not shown, is mounted in the socket 12 to receive gyratory movement therefrom by a two-piece ball member comprising a tubular portion 16 and an annular ball portion 17 removably fitted on the tubular portion. The tubular portion 16 is provided with an inwardly extending annular flange 18 arranged with tapped holes 19 for the removable mounting of a closure plate, not shown, to form a lubricant reservoir. The lower end portion of the gyratory shaft is engaged in the tubular portion 16 within the lubricant reservoir. The tubular portion 16 is also provided with an internal bearing surface 20 terminating above the lubricant reservoir for contact with the gyratory shaft. Movement of the tubular portion 16 into the ball portion 17 is limited by an annular shoulder 21 in the outer surface of the upper section of the tubular portion 16 abutting the upper end of the ball portion 17, as shown in Figures 1 and 6. The ball portion 17 has a convex outer face 22 of a curvature and diameter to slide or oscillate in the socket 12.

The ball member is made of two pieces to facilitate mounting the ball member in the one-piece sleeve 7. The ball member is mounted in the socket 12 by inserting the ball portion 17 in the socket 12 before the tubular portion 16 is assembled in the ball portion 17. The ball portion 17 is inserted in edgewise position with the axis of the ball portion extending transversely or at a right angle of the axis of the socket 12. The ball portion 17 is inserted in said edgewise position into the recesses 15, as shown in Figure 3, and then the ball portion is revolved ninety degrees to lie within the socket 12.

Subsequent to positioning the ball portion 17 in the socket 12, the tubular portion 16 is inserted in the ball portion 17, as shown in Figure 1, until the shoulder 21 abuts the ball portion 17, as shown in Figure 6.

The tubular portion 16 and ball portion 17 are secured together by a headed pin 23 fitted in aligned openings 24 and 25 in the tubular and ball portions, respectively. The shoulder 21 abutting the ball portion 17 will align the openings 24 and 25. The pin 23 is fitted in said aligned openings 24 and 25 through an opening 26 in the sleeve 7 and the wall of the socket 12. The axis of said opening 26 extends below the transverse axis or center of the socket and the opening 26 within the wall of the socket 12 is offset, as at 27. The pin 23 is fitted in the aligned openings 24, 25 by canting the tubular portion 16 and ball portion 17 in the manner shown in Figure 4, so that the axes of the aligned openings 24, 25 are at an acute angle to the axis of the opening 26 to receive the pin 23 positioned in alignment with the openings 24, 25. The diameter of the opening 26 is greater than the diameter of the head of the pin 23 so that the pin is passed therethrough in canted position. After the pin 23 is fully fitted in the openings 24, 25, the tubular portion 16 and ball portion 17 are adjusted to upright position with the axes of the tubular and ball portions parallel to the axis of the sleeve 7, as shown in Figure 6. In this upright position of the tubular and ball portions, the axis of the pin 23 is above the center of the opening 26, and the shoulder formed between the opening 26 and offset 27 prevents removal of the pin 23 as any outward movement of said pin will cause the head of the pin to abut said shoulder. The pin 23 will also retain the ball portion 17 in the socket 12 in conjunction with the straight end portions 14 of the socket 12. The pin 23 and straight end portions 14 permit sufficient oscillation of the ball portion 17 in the socket 12 to prevent binding of the gyratory shaft in the sleeve 7.

After the tubular portion 16 is adjusted to upright position, the gyratory shaft is mounted in said tubular portion.

Having thus described my invention, I claim:

An eccentric mounting for the shaft of a gyratory crusher comprising a rotary one-piece sleeve arranged with an internal annular socket eccentric of the axis of the sleeve, said sleeve and socket provided with an opening extending transversely of the axis of the sleeve, a two-piece ball member comprising a tubular portion to be mounted on the shaft of the gyratory crusher and an annular ball portion removably mounted on said tubular portion and mountable in the socket before mounting said ball portion on the tubular portion, and a pin securing the tubular portion and ball portion together and placed in said securing position through the opening in the sleeve and socket from the interior of the sleeve, the axis of the opening in the sleeve and socket being one one side of the transverse axis of the socket to permit securing of the pin in the ball and tubular portions with the ball and tubular portions in canted position in the sleeve, and the socket end of said opening being offset to prevent removal of the pin when the axes of the ball and tubular portions are parallel to the axis of the sleeve.

References Cited in the file of this patent

UNITED STATES PATENTS

| | | |
|---|---|---|
| 1,143,203 | Kennedy | June 15, 1915 |
| 1,748,484 | Kennedy | Feb. 25, 1930 |
| 2,327,384 | Annesley | Aug. 24, 1943 |
| 2,422,684 | Collito | July 8, 1947 |
| 2,518,648 | Travis | Aug. 15, 1950 |